Sept. 26, 1961 W. C. WALKER 3,001,324
HOOP PROPELLING DEVICE
Filed May 2, 1957

Inventor
Willie Charles Walker

United States Patent Office 3,001,324
Patented Sept. 26, 1961

3,001,324
HOOP PROPELLING DEVICE
Willie Charles Walker, 532 12th Ave., Tuscaloosa, Ala.
Filed May 2, 1957, Ser. No. 656,658
2 Claims. (Cl. 46—220)

My invention is primarily, and for all practical purposes, a toy; and relates specifically to a device, by means of which a hoop or ring is put in motion, guided, fully controlled and stopped.

This hoop propelling device, by virtue of its extreme simplicity represents an improvement over those of Roth 1,714,448, and Heath 2,149,960.

While my "hoop" is free running, and under certain conditions could get out of hand, this becomes in itself a salient feature. If a ball is attached to a rubber band, then it is quite certainly limited in its sphere of operation. Since the hoop will fall over at rest, and is quite unstable at low speed, certain experience and prowess is necessary if it is to be operated efficiently. Thus, I not only submit a device for propelling a hoop, but also a method, and/or, technique of operation.

Therefore, in the process of learning to roll a "hoop," and in becoming a good operator thereof, a child will possibly spend many hours of walking, running and playing. This exercise and wholesome entertainment is most beneficial to a growing child.

Figure 1:
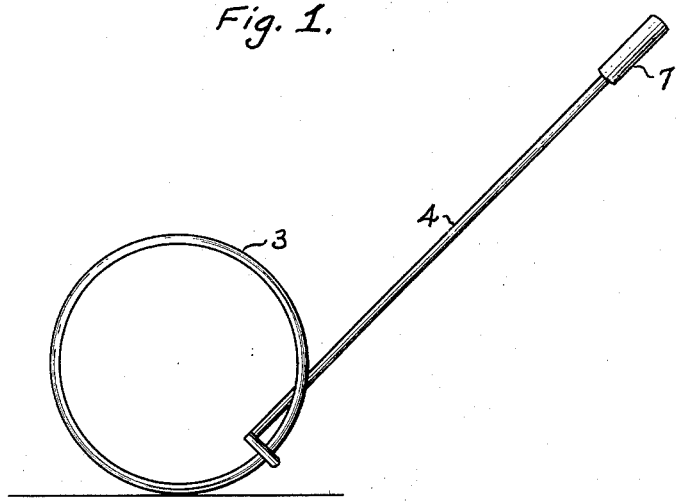
FIGURE 1 is a side elevation showing my hoop and propelling device in operation.
Figure 2:
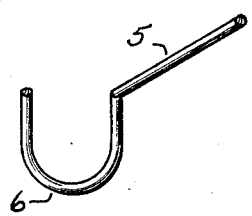
FIGURE 2 is an enlarged fragmentary perspective view of the fork.

Please note that leader 4 includes staff 5, fork 6, and handle 7.

To fashion my invention, take a length of heavy wire of perhaps 3/16" diameter, and at one end proceed to make a U-shaped turn. Measure the height of the free end and mark the corresponding distance on the staff 5, or standing part of the wire. Now, by holding staff 5 by its other end, so that the U turn extends laterally to your left, bend the U downward at its marked point so that staff 5 is now perpendicular to the plane of the U. The fork is now designated as part 6.

For left-handed operators, the fork 6, might be bent so that, when the device, (leader 4), is in position to propel a hoop, the said fork 6 occupies a position to the right of staff 5.

The handle 7 on the opposite end of staff 5 may be formed in any suitable manner from said staff 5, or an external handle of wood, plastic, etc., may be attached thereon.

To roll the hoop I offer these basic directions:

Place hoop 3 in fork 6 so that bottom of hoop 3 is just touching, or slightly above the ground. Now push leader 4, forward and downward, causing hoop 3 to start rolling. You now withdraw leader 4 by moving to right and engage fork 6 behind hoop 3 about one and one-half (1½) inches above ground level. (See FIGURE 1.)

The "hoop" is now in motion. Speed is controlled by the push the operator imparts on leader 4. Steering and bank on curves is as natural as maintaining one's own equilibrium and needs no further explanation.

To stop the "hoop," turn handle 7 one-half (½) turn to right so that fork 6 now engages the inside surface of hoop 3. By a slight backward or retarding pressure, hoop 3 is now made to slow down or stop. Just before hoop 3 is ready to fall over, remove leader 4 and pick up hoop 3 in fork 6.

The foregoing is a description of the basic invention. It is to be understood that use of various materials as well as certain constructional details and designs, etc., are in harmony with the spirit of the invention and do not constitute a departure thereof.

Having thus disclosed the invention, I claim:

1. A hoop propelling device comprising a rod of stiff material with one end designated as a handle and the other end as a fork, said fork being formed U-shaped with one of the U-shape ends integral with the rod and with the plane of the back face of the U positioned at a 90 degree angle compared with the straight plane of the rod; the arms of the U being parallel and similarly formed, and the rod terminating at the upper end of the arm which is spaced from the body portion of the rod.

2. A toy comprising a round hoop and propelling device therefor, said hoop being made of stiff material, said propelling device consisting of a rod of stiff material with one end designated as a handle and the other end as a fork, said fork being formed U-shaped with one of the U-shape ends integral with the rod and with the plane of the back face of the U-shape positioned at a 90 degree angle compared with the straight plane of the rod; the arms of the U being parallel and similarly formed with the rod terminating at the upper end of the arm which is spaced from the body portion of the rod; said fork being of a size to fit loosely upon the hoop with the bottom of its U in contact with the hoop.

References Cited in the file of this patent

UNITED STATES PATENTS

| | | |
|---|---|---|
| 1,202,120 | Stuckel | Oct. 24, 1916 |
| 1,272,240 | Enemoto | July 9, 1918 |
| 1,574,255 | Myslinski | Feb. 23, 1926 |
| 2,251,599 | Peterson | Aug. 5, 1941 |
| 2,697,304 | Welch | Dec. 21, 1954 |
| 2,718,092 | Grant | Sept. 20, 1955 |

FOREIGN PATENTS

| | | |
|---|---|---|
| 54,929 | Germany | Jan. 12, 1891 |